US011847478B2

(12) United States Patent
Wiggers et al.

(10) Patent No.: US 11,847,478 B2
(45) Date of Patent: Dec. 19, 2023

(54) REAL-TIME FEEDBACK ASSOCIATED WITH CONFIGURING VIRTUAL INFRASTRUCTURE OBJECTS USING TAGS

(71) Applicant: VMware, Inc., Palo Alto, CA (US)

(72) Inventors: Maarten Wiggers, San Francisco, CA (US); Biliana Gueorguieva Gelkova, Sofia (BG); Janani Subhashini Umamaheswaran, Palo Alto, CA (US); Pamel Shinh, Palo Alto, CA (US); Leda Lyudmilova Grigorova-Borisova, Sofia (BG); Sruthi Cherukuri, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/746,589

(22) Filed: Jan. 17, 2020

(65) Prior Publication Data

US 2021/0224088 A1 Jul. 22, 2021

(51) Int. Cl.
*G06F 9/455* (2018.01)
*H04L 41/22* (2022.01)
*G06F 3/04847* (2022.01)
*G06F 3/0482* (2013.01)

(52) U.S. Cl.
CPC ........ *G06F 9/45533* (2013.01); *G06F 3/0482* (2013.01); *G06F 3/04847* (2013.01); *H04L 41/22* (2013.01); *G06F 9/45545* (2013.01)

(58) Field of Classification Search
None
See application file for complete search history.

(56) References Cited

U.S. PATENT DOCUMENTS

| | | | |
|---|---|---|---|
| 8,321,862 B2 | 11/2012 | Swamy et al. | |
| 8,515,902 B2 * | 8/2013 | Savage | G06F 16/93 707/610 |
| 8,718,547 B2 * | 5/2014 | Isomursu | H04L 67/12 455/41.1 |

(Continued)

OTHER PUBLICATIONS

New Features for VMware Cloud on AWS, AWS Release Notes—SDDC Version 1.5, Sep. 6, 2018, Retrieved on Jan. 18, 2020 from the Internet at <URL: https://docs.vmware.com/en/VMware-Cloud-on-AWS/0/m/vmc-on-aws-relnotes.html#wn09062018>.

*Primary Examiner* — Mohamed Abou El Seoud
*Assistant Examiner* — Koorosh Nehchiri
(74) *Attorney, Agent, or Firm* — SU IP CONSULTING

(57) ABSTRACT

An example method may include receiving a first GUI selection of a first management server corresponding to a first cluster of virtual infrastructure objects, receiving a second GUI selection of one or more first virtual infrastructure object tags to be assigned to at least one virtual infrastructure object from the first cluster of virtual infrastructure objects after a creation process of a first policy, wherein the first policy is configured to regulate the at least one virtual infrastructure object from the first cluster of virtual infrastructure objects with the one or more first virtual infrastructure object tags, receiving first real-time feedback associated with the first cluster of virtual infrastructure objects and the one or more first virtual infrastructure object tags from the first management server, and displaying a object count in a first GUI element supported by the configuration client.

13 Claims, 4 Drawing Sheets

(56) References Cited

U.S. PATENT DOCUMENTS

| | | | |
|---|---|---|---|
| 8,799,431 B2* | 8/2014 | Pabari | G06F 9/5072 |
| | | | 709/224 |
| 8,868,711 B2 | 10/2014 | Skjolsvold et al. | |
| 9,038,083 B2* | 5/2015 | Huang | G06F 9/5055 |
| | | | 718/104 |
| 9,104,463 B2 | 8/2015 | Mahindru et al. | |
| 9,116,731 B2* | 8/2015 | Tung | G06F 9/5072 |
| 9,250,969 B2* | 2/2016 | Lagar-Cavilla | G06F 9/5077 |
| 9,461,881 B2 | 10/2016 | Kumarasamy et al. | |
| 9,602,380 B2 | 3/2017 | Strassner | |
| 9,703,647 B2* | 7/2017 | Ditto | G06F 11/1484 |
| 9,787,598 B2* | 10/2017 | Bertram | H04L 41/5054 |
| 9,813,305 B2* | 11/2017 | Bertram | H04L 47/70 |
| 9,825,877 B2 | 11/2017 | Mohindra et al. | |
| 10,067,803 B2 | 9/2018 | Cropper et al. | |
| 10,075,470 B2* | 9/2018 | Vaidya | H04L 63/20 |
| 10,133,619 B1* | 11/2018 | Nagpal | G06F 11/0787 |
| 10,241,815 B2* | 3/2019 | Bertram | G06F 9/44505 |
| 10,325,009 B2 | 6/2019 | Chen | |
| 10,325,102 B2* | 6/2019 | AthuluruTlrumala et al. | H04W 4/50 |
| 10,333,775 B2 | 6/2019 | Nicholas et al. | |
| 10,496,692 B1* | 12/2019 | Kahrs | G06F 16/955 |
| 10,594,730 B1* | 3/2020 | Summers | H04L 63/0892 |
| 10,853,148 B1 | 12/2020 | Kenney et al. | |
| 10,986,131 B1* | 4/2021 | Kruse | H04L 63/10 |
| 2008/0134178 A1* | 6/2008 | Fitzgerald | G06F 9/45537 |
| | | | 718/1 |
| 2008/0244579 A1* | 10/2008 | Muller | G06F 9/48 |
| | | | 718/100 |
| 2011/0173302 A1* | 7/2011 | Rider | G06F 9/44505 |
| | | | 709/220 |
| 2011/0173303 A1* | 7/2011 | Rider | G06F 9/44505 |
| | | | 709/220 |
| 2011/0191477 A1 | 8/2011 | Zhang et al. | |
| 2011/0231899 A1 | 9/2011 | Pulier et al. | |
| 2012/0096461 A1 | 4/2012 | Goswami et al. | |
| 2013/0212576 A1* | 8/2013 | Huang | G06F 9/5055 |
| | | | 718/1 |
| 2013/0339510 A1* | 12/2013 | Douglas | H04L 41/50 |
| | | | 709/223 |
| 2014/0101226 A1 | 4/2014 | Khandekar et al. | |
| 2014/0129715 A1 | 5/2014 | Mortazavi | |
| 2014/0172960 A1 | 6/2014 | Lee et al. | |
| 2014/0282536 A1* | 9/2014 | Dave | G06F 9/45558 |
| | | | 718/1 |
| 2014/0365662 A1* | 12/2014 | Dave | G06F 9/45533 |
| | | | 709/226 |
| 2015/0220357 A1* | 8/2015 | Huang | G06F 9/5055 |
| | | | 718/1 |
| 2015/0341230 A1* | 11/2015 | Dave | H04L 41/0893 |
| | | | 705/7.29 |
| 2016/0057041 A1* | 2/2016 | Gupta | H04L 41/5025 |
| | | | 706/12 |
| 2016/0182403 A1* | 6/2016 | Sarkar | H04L 41/0886 |
| | | | 709/226 |
| 2016/0216992 A1* | 7/2016 | Vavrick | G06F 9/45558 |
| 2017/0034075 A1* | 2/2017 | Burk | H04L 41/0893 |
| 2017/0063720 A1* | 3/2017 | Foskett | G06F 9/5072 |
| 2017/0147399 A1* | 5/2017 | Cropper | G06F 9/5083 |
| 2019/0386891 A1* | 12/2019 | Chitalia | H04L 43/0811 |
| 2020/0007459 A1 | 1/2020 | Guzman et al. | |

* cited by examiner

New Policy

- VM Management Server Name: VM management server 120 — 215
- 221 → Policy Type: VM Host affinity
- 217 → Policy Name: vm host affinity 1
- 222 → VM Tag: [VM Category 1] [vmTag] ←-- 224
- 226 → *M* virtual machines currently have this tag
- 223 → Host Tag: [Host Category 1] [Host VM Affinity Tag] ←-- 225
- 227 → *N* hosts currently have this tag

[Cancel] [Create]

Create-Policy Window
210

---

Assign Tag for VM: v-12

241, 242

| Selected | Tag Name | Category |
|---|---|---|
| Yes | vmTag | VM Category 1 |
| No | Host VM Affinity Tag | Host Category 1 |

Real-Time Feedback: Adding "vmTag" will apply the following policies to the new VM: "vm vm affinity 1" and "vm host affinity 1"

244

[Save] [Cancel]

Assign-Tag Window
230

FIGURE 2

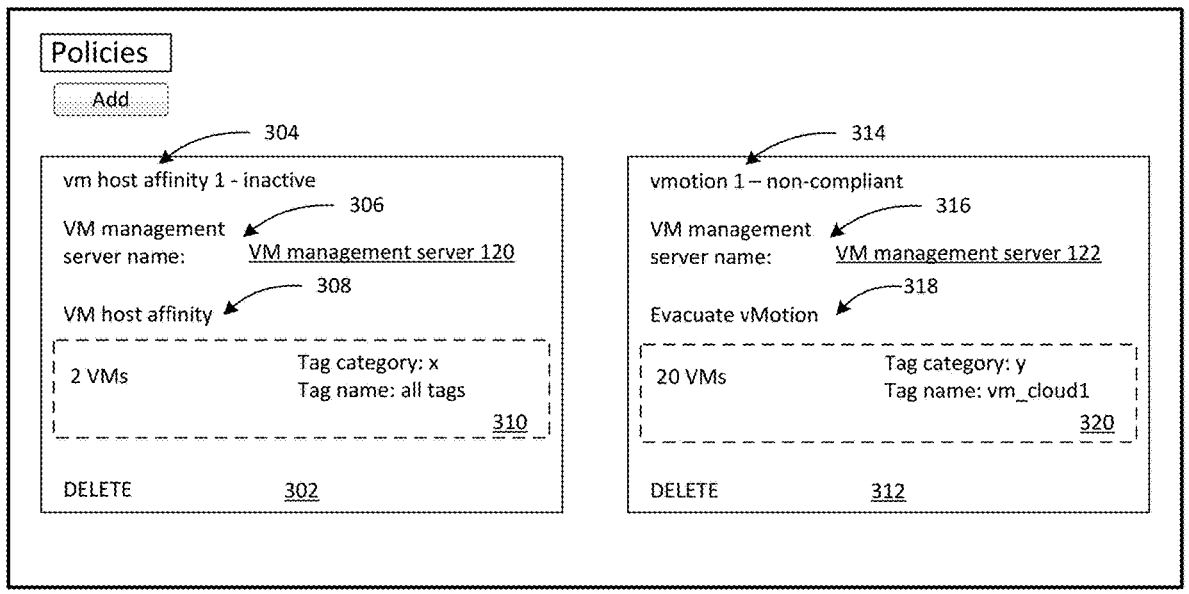
Management Window
300
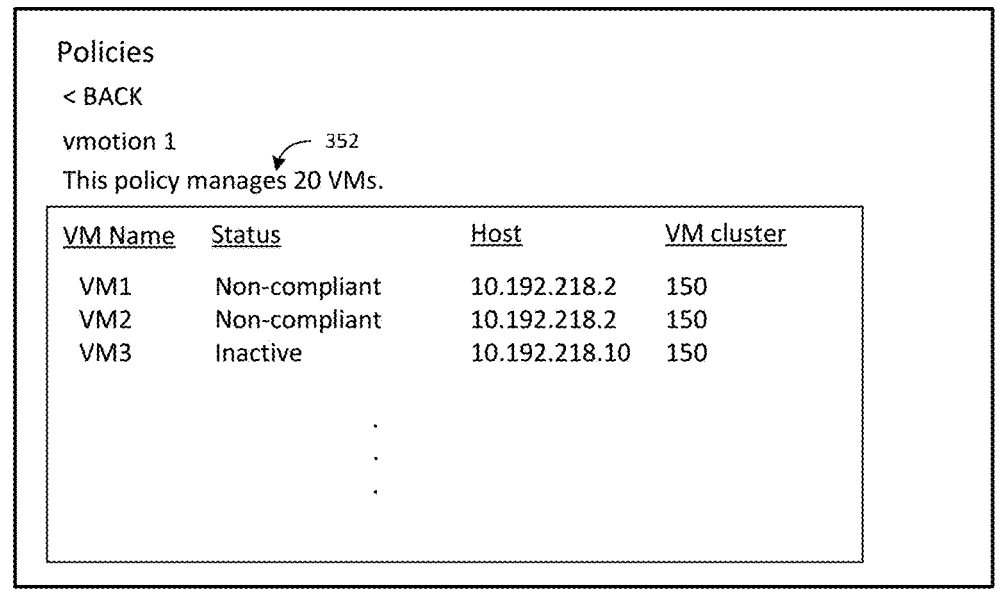
Details View
350
FIGURE 3

REAL-TIME FEEDBACK ASSOCIATED WITH CONFIGURING VIRTUAL INFRASTRUCTURE OBJECTS USING TAGS

BACKGROUND

When creating a group of virtual machines, a common set of virtual machine configurations or services may be deployed to each of the virtual machines in a virtual machine group. However, in some special scenarios, having the same set of virtual machine services for all the virtual machines in the virtual machine group may not be ideal, as some of the virtual machines may need to have specific services deployed (e.g., services to reduce the workload of the virtual machine group) while the other virtual machines may require just certain common services.

In addition, as more and more virtual machines and management servers are deployed, monitoring and configuring all these virtual machines and management servers becomes increasingly difficult and burdensome.

BRIEF DESCRIPTION OF THE DRAWINGS

FIG. 2 illustrates multiple GUI windows configured to create policies, assign tags, and display real-time feedback information, according to one or more embodiments of the present disclosure.

FIG. 3 illustrates example GUI elements for managing multiple policies, according to one or more embodiments of the present disclosure.

DETAILED DESCRIPTION

Figure 1:
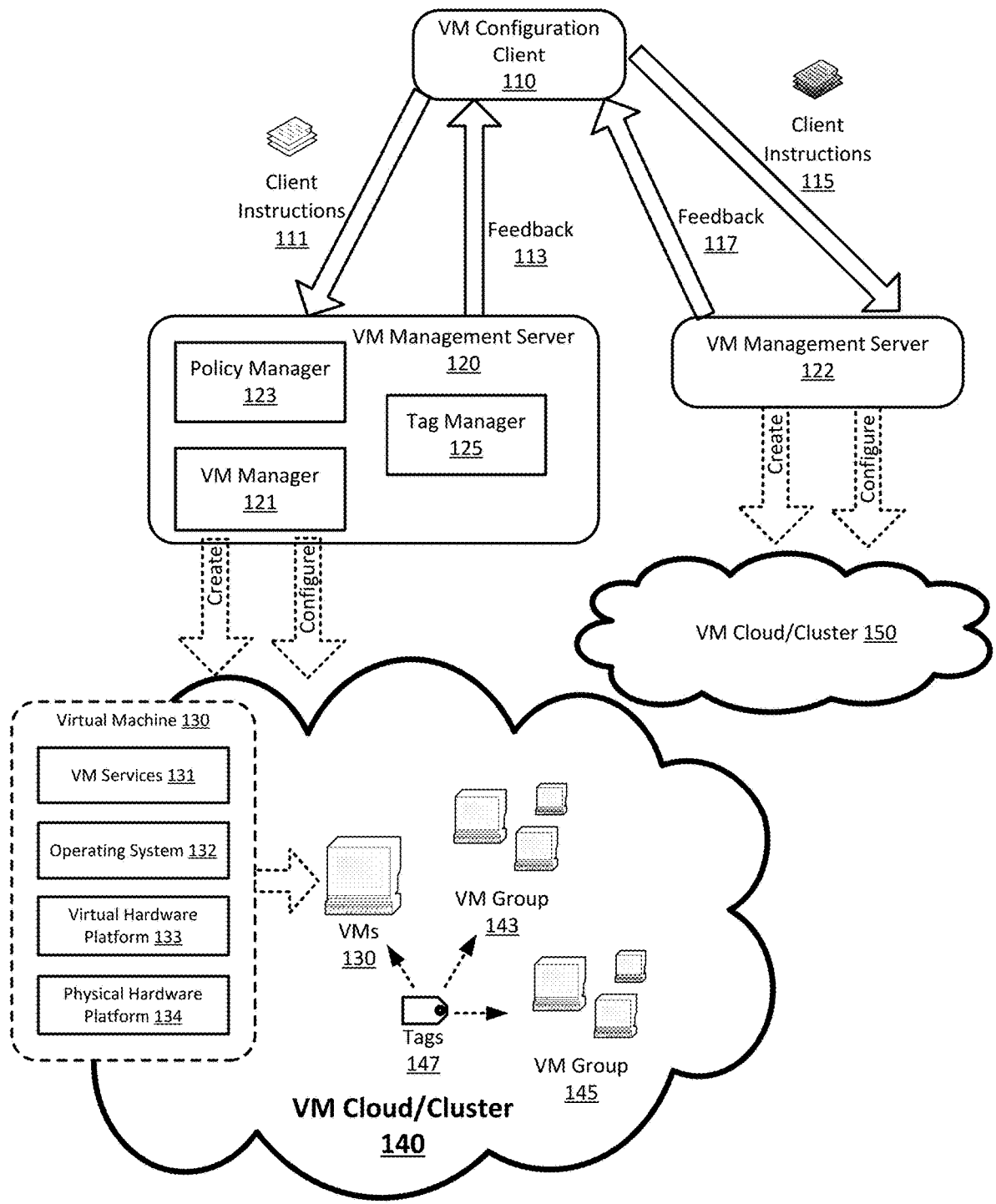
FIG. 1 illustrates a block diagram of an example virtualized computing environment that can be utilized to configure virtual machines with tags, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of an example virtualized computing environment that can be utilized to configure virtual infrastructure objects with tags, according to one or more embodiments of the present disclosure. For clarity, subsequent discussions mainly focus one example of virtual infrastructure objects (e.g., virtual machines or VMs) and their underlying physical resources (e.g., hosts). The methods and systems described below are applicable to other virtual infrastructure objects, such as datastores, and their underlying physical resources, such as disks. Tags assigned to virtual infrastructure objects are referred to as virtual infrastructure object tags.

A virtual machine (VM) configuration client may interact with multiple VM management servers to configure one or more VMs in multiple VM clouds/clusters. To illustrate, VM configuration client 110 may interact with VM management servers 120 and 122 to configure the VMs in VM clouds/clusters 140 and 150. VM configuration client 110 may support a graphic user interface (GUI), which allows a user (e.g., an administrator) to initiate the creating and configuring of the VMs in particular clouds/clusters by selecting a VM management server and transmitting one or more client instructions to the selected VM management server. For example, VM configuration client 110 may select VM management server 120 and transmit client instructions 111 to VM management server 120 to interact with VMs 130 in VM cloud/cluster 140. With the selected VM management server 120, VM configuration client 110 may also display up-to-date information on its GUI based on real-time feedback 113 that it receives from VM management server 120. On the other hand, if VM configuration client 110 selects VM management server 122, then it can transmit client instructions 115 to VM management server 122 to interact with the VMs in VM cloud/cluster 150 and display up-to-date information on its GUI based on real-time feedback 117 that it receives from VM management server 122.

In some embodiments, VM configuration client 110 may be a client software application installed on a client computer (e.g., a personal computer or workstation). VM configuration client 110 may also be a web-based application operating in a browser environment. VM configuration client 110 may interact with VM management server 120 and VM management server 122 via Transmission Control Protocol/Internet Protocol (TCP/IP), Hypertext Transfer Protocol (HTTP), or any other feasible network communication means. Alternatively, VM configuration client 110 may be implemented as a software/hardware module executing directly on VM management server 120. In some embodiments, VM management server 120 may be implemented using a VMWARE® vSphere ESXi server, and VM configuration client 110 may be implemented using a VMWARE® vSphere client.

In some embodiments, VM management server 120 may be configured to manage VM cloud/cluster 140, which includes, among other components, one or more VMs (e.g., VMs 130), one or more VM groups (e.g., VM group 143), and/or one or more hosts (not explicitly shown in FIG. 1). VM cloud/cluster 140 may support a network-based computing architecture that provides a shared pool of computing resources (e.g., networks, data storages, applications, and services) on demand. VM management server 120 may implement VM cloud/cluster 140 based on a virtualized infrastructure, in order to provide provisioning, pooling, high-availability, and automation to these computing resources. Specifically, VM management server 120 may configure these computing resources using one or more VMs 130. VM management server 122 and VM cloud/cluster 150 may also be set up in the above discussed manner similar to VM management server 120 and VM cloud/cluster 140, respectively.

In some embodiments, a VM, such as VM 130, may be an abstraction of an actual physical computer system. The physical computer system may be based on (e.g., installed on) a physical hardware platform, such as 134, which may be referred to as a "host", a "physical host", or a "host component" of VM 130. VM management server 120 may include a "hypervisor" to construct virtual hardware platform 133 based on physical hardware platform 134. Virtual hardware platform 133 may be referred to as a "guest component" of VM 130. Thus, physical hardware platform 134 may include the underlying hardware resources (e.g., processing power, memory, disk and network I/O (input/output)) for virtual hardware platform 133, thereby allowing VM 130 to function as if it were a physical machine.

In some embodiments, physical hardware platform 134 (e.g., an x86 architecture platform) may be configured with, without limitation, one or more physical Central Processing Unit (CPU), physical memory, physical storage (e.g., hard drive), physical Network Interface Card (NIC), and/or additional electronic circuit components (all of which are not shown in FIG. 1). The physical CPU may be a general-purpose or specialized computing processor having electronic circuitry to perform arithmetical, logical, and input/output operations for physical hardware platform 134. The physical CPU may be configured to support functions of VM 130 and/or VM management server 120. The physical memory may be hardware storage devices having integrated circuits for storing information used in VM management server 120 and VMs 130. The physical memory may be volatile memory (e.g., dynamic random-access memory (DRAM) or CPU cache memory) or non-volatile memory (e.g., hard drive or flash memory). In some embodiments, the physical memory may be non-transitory computer-readable storage medium, containing a set of instructions which, when executed by the physical CPU, cause the physical CPU to perform methods of creating and configuring VMs 130. The NIC may be network communication hardware for transmitting messages in VM cloud/cluster 140.

In some embodiments, virtual hardware platform 133 may be configured with one or more "virtual hardware components", which are supported by the physical hardware components in physical hardware platform 134. In other words, the virtual hardware components, which may include, without limitation, one or more virtual CPUs, virtual memory, virtual storage, virtual NIC, may be configured to emulate the physical hardware components in physical hardware platform 134. After VM 130 is created, guest operating system (OS) 132 may be installed in VM 130 to execute and support applications and services such as VM services 131. OS 132 may be a WINDOWS®, UNIX®, LINUX®, or iOS® operating system. VM services 131 may include any network, storage, image, or application services that can be executed on VM 130 based on OS 132. After VM 130 is created, it may be used to provide various cloud services in VM cloud/cluster 140.

In some embodiments, VM management server 120 may include VM manager 121 to manage the creating and configuring of VM cloud/cluster 140, as well as the VMs 130 and VM groups 143 and 145 in VM cloud/cluster 140. A "VM group" may include multiple hosts and the associated VMs 130 with shared resources and shared management interfaces. For example, VM cloud/cluster 140 may be a VMWARE® Distributed Resource Scheduler (DRS) cluster. VM manager 121 may provide centralized management capabilities, such as VM creation, VM configuration, VM updates, VM cloning, VM high-availability, VM resource distributions, etc. In some embodiments, VM manager 121 may be a VMWARE® vCenter server.

In some embodiments, VM management server 120 may include policy manager 123 for the creating and applying of policies to one or more VMs and VM groups in VM cloud/cluster 140. A "policy" may refer to a configuration mechanism to specify how VMs 130 and hosts in a resource pool (e.g., VM group) should be configured. In some instances, a policy may be an affinity policy, which may correspond to one or more restrictions to be applied to VMs 130 and hosts during installation and configuration. Further, an affinity policy may be a "positive-affinity" or an "anti-affinity" policy. A positive-affinity policy may dictate that a certain VM 130 should be installed on a particular host, or multiple VMs 130 should be installed on a common host. An anti-affinity policy may indicate that multiple VMs 130 should NOT share a common host and should each be installed onto a different host.

For example, VM group 143 may be configured with positive-affinity policies. In this case, VM manager 121 may create and configure the VMs in VM group 143 together on common or dedicated hosts. VM group 145 may be configured with anti-affinity policies. In this case, VM manager 121 may create and configure each of the VMs in VM group 145 onto a corresponding host that is not shared by any other VMs in VM group 145. Thus, the positive-affinity policies and anti-affinity policies may cause VM manager 121 to keep VMs 130 either together or separated, in order to reduce traffic across the networks or keep the virtual workload balanced in VM cloud/cluster 140.

In some embodiments, policy manager 123 may apply one or more VM-Host affinity policies to VM group 143. A "VM-Host affinity policy" may describe a relationship between a category of VMs and a category of hosts. To place VMs or hosts in categories, they can be assigned with tags (e.g., tags 147), and the tags are then grouped in categories. Throughout this document, categories of objects (e.g., VMs, hosts) are used interchangeably with categories of the tags assigned to these objects.

For example, VM-Host affinity policies may be applicable to some VMs and hosts when host-based licensing requires VMs that are running certain applications to be placed on hosts that are licensed to run those applications. VM-Host affinity policies may also be useful when VMs with workload-specific configurations require placement on hosts that have certain characteristics. Based on a VM-Host affinity policy, VM manager 121 may deploy those VMs on hosts both of which are covered by the policy.

In some embodiments, policy manager 123 may apply one or more VM-VM affinity policies to VM group 143. A "VM-VM affinity policy" may describe a relationship between members of a category of VMs. In other words, a VM-VM affinity policy may establish an affinity relationship between VMs in a given category. VM-VM affinity policies may be applicable to two or more VMs in a category that can benefit from locality of data reference or where placement on the same host can simplify auditing. Policy manager 123 may create a VM-VM affinity policy to deploy all VMs in the category covered by the policy on the same host.

In some embodiments, policy manager 123 may apply one or more VM-Host anti-affinity policies to VM group 145. A "VM-Host anti-affinity policy", which describes a relationship between a category of VMs and a category of hosts, may be used to avoid placing VMs that have specific host requirements (such as a GPU or other specific hardware devices, or capabilities such as IOPS control), on hosts that can't support those requirements. Based on a VM-Host anti-affinity policy, VM manager 121 and policy manager 123 may deploy VMs on hosts according to the policy, and may prevent/block those deployments that may violate this policy.

In some embodiments, policy manager 123 may apply one or more VM-VM anti-affinity policies to VM group 145. A "VM-VM anti-affinity policy", which describes a relationship among a category of VMs, may discourage placement of VMs in the same category on the same host. VM manager 121 and policy manager 123 may place VMs running critical workloads on separate hosts, so that the failure of one host does not affect other VMs in the category.

In some embodiments, VM management server 120 may further include tag manager 125 to use tags for configuring one or more VMs and VM groups in VM cloud/cluster 140. A "tag" may be a label that can be applied to objects (e.g., VMs, hosts, VM groups, policies, etc.) in VM cloud/cluster 140, in order to make it easier to categorize, sort, and search for these objects. Alternatively, a tag may store the common metadata (e.g., physical location, hardware configuration, etc.) of the objects. Further, a "VM tag" may be a label that can be assigned to multiple VMs, each of which shares a common characteristic among themselves. A VM tag is one example of a virtual infrastructure object tag. A "host tag" may be assigned to a set of hosts that can be grouped together.

In some embodiments, a tag category may be used to group multiple tags together, or to define how tags can be applied to objects. For example, when multiple policies, VMs, and hosts share a common tag, this common tag is used to group such entities. Further, a "VM tag category" may group a set of VM tags, and a "host tag category" may group a set of host-related tags such as VM-host affinity tags.

In some embodiments, based on client instructions 111 from VM configuration client 110, VM manager 121 may interact with tag manager 125 to create or delete tags from entities. Further, when client instructions 111 are to delete a tag, tag manager 125 may interact with policy manager 123 to remove all policies that are associated with the to-be-deleted tag.

In some embodiments, a user may interact with VM configuration client 110 to perform various VM configuration operations such as VM creation, policy creation, and tag deletions, etc. VM configuration client 110 may transmit user initiated operations as one or more client instructions 111 to VM management server 120. VM manager 121, policy manager 123, and tag manager 125 may perform their respective operations based on the received client instructions 111, and may transmit feedback 113 back to VM configuration client 110.

In some embodiments, the GUI of the VM configuration client 110 may receive a command from the user to assign one or more tags to an already existing VM. These one or more tags may already be associated with one or more policies. In order to allow the user to receive real-time feedback, VM configuration client 110 may request (via client instructions 111) VM management server 120 to provide information related to tags and their respective associated policies, and return such information as real-time feedback 113 to VM configuration client 110. VM configuration client 110 may display the real-time feedback on its GUI.

In some embodiments, before a user may delete a tag via the GUI of the VM configuration client 110, the tag may already be associated with one or more policies. In order to allow the user to receive real-time feedback, VM configuration client 110 may request (via client instructions 111) VM management server 120 to provide information related to the tag and their respective associated policies, and return such information as feedback 113 to VM configuration client 110. Then, VM configuration client 110 may display the real-time feedback on its GUI, notifying the user of the policies that may be deleted along with the tag-deletion operation. Thus, the above approach ensures that real-time feedback 113 of the various operations is presented to the user before the user invokes these operations via the GUI of VM configuration client 110. The details of the creating and configuring VMs with policies and tags are further described below.

FIG. 2 illustrates multiple GUI windows configured to create policies, assign tags, and display real-time feedback information, according to one or more embodiments of the present disclosure. Specifically, a VM management server (similar to VM management server 120 or VM management server 122 of FIG. 1) that interacts with a VM cloud/cluster (similar to VM cloud/cluster 140 or VM cloud/cluster 150 of FIG. 1) may receive from a VM configuration client (similar to VM configuration client 110 of FIG. 1) a set of client instructions. In some embodiments, the VM configuration client may support GUI elements such as create-policy window 210 and assign-tag window 230.

For simplicity, the operations associated with these GUI windows illustrated in FIG. 2 are discussed in conjunction with FIG. 1.

Creation of a New Policy

In some embodiments, create-policy window 210 corresponds to a GUI element for creating a new policy in the VM cloud/cluster (e.g., VM cloud/cluster 140 or VM cloud/cluster 150). Specifically, via create-policy window 210, a user may select one of the VM management servers that VM configuration client 110 has access to and specify various values and information for a new policy. Afterward, the user may click on the "create" button, which causes VM configuration client 110 to transmit client instructions 111 to the selected VM management server, which may in turn generate the requested policy accordingly.

In some embodiments, for all the VM management servers that VM configuration client 110 has access to, they are presented as selectable options in server selection drop-down menu 215. Suppose the user selects VM management server 120 for VM cloud/cluster 140 via server selection drop-down menu 215, the user may then enter "vm host affinity" via text field 217 in create-policy window 210 as the name of the new policy and may further assign the new policy with one of the policy types, each of which is selectable via policy type drop-down menu 221. Some example policy types may include, without limitation, "VM-Host Affinity", "VM-VM Affinity", "VM-Host Anti-affinity", "VM-VM Anti-affinity," "Disable DRS vMotion," and "Evacuation by vMotion."

Suppose the new policy corresponds to the selected type of VM-Host Affinity. The user may associate this new policy with at least one VM from the VM cloud/cluster 140 with one or more VM tags assigned to it. In some embodiments, after having selected a VM tag category via VM category drop-down menu 222 and a VM tag via VM tag drop-down menu 224 in create-policy window 210, all the VMs that meet the selected criteria are counted in real-time and displayed in create-policy window 210 in first object count 226 (e.g., M virtual machines currently have this tag). These VMs also become associated with this new policy after the user selects "Create."

In some embodiments, after having selected a host tag category via host category drop-down menu 223 and a host tag via host tag drop-down menu 225 in create-policy window 210, all the hosts that meet the selected criteria are counted in real-time and displayed in create-policy window 210 in second object count 227 (e.g., N hosts currently have this tag). These hosts also become associated with this new policy after the user selects "Create." In some embodiments, the selection of "Create" may transmit the selected information to VM management server 120, which may then utilize policy manager 123 to create and save the new policy.

In some embodiments, after having selected the VM tag category, the VM tag, the host tag category, and the host tag, VM configuration client 110 may transmit client instructions 111 with the selected items to VM management server 120, which may utilize its tag manager 125 to retrieve relevant tag categories and tags. Then VM management server 120 may return these tag categories and tags as feedback 113 to VM client configuration client 110, which presents the information via its GUI.

Tag Assignment

In some embodiments, VM configuration client 110 may include assign-tag window 230, which allows a user to select one or more tags to be assigned to the created VM. As illustrated in FIG. 2, assign-tag window 230 is for an already created VM identified as "v-12." Assign-tag window 230 may load all available tags from VM management server 120 and present these tags in tag names 241 and/or in categories 242. In other words, the user may either pick from all the available names 241, or browse by categories 242, until identifying the suitable tags for the new VM. Alternatively, drop-menus with selectable choices of names and categories may be presented to the user.

In some embodiments, each newly created VM may be assigned with one or more tags. As illustrated in FIG. 2, assign-tag window 230 presents two available tags for assignment to the new VM. One VM tag with the name of "vmTag" and the category of "VM category" may be assigned to one or more VMs or one or more policies associated with certain VMs. One host tag with the name of "Host VM Affinity Tag" and the category of the "Host Category" may be assigned to one or more hosts or one or more policies associated with certain hosts.

In some embodiments, the user may make a GUI selection on assign-tag window 230 and "select" no-tag, one-tag, or two-tags for the new VM. When the user makes a single GUI selection in assign-tag window 230, in order to provide real-time feedback to the user, prior to the user invoking any additional GUI operations, VM configuration client 110 may transmit client instructions 111 to VM management server 120. Client instructions 111 may include, without limitation, the identification of the selected tag(s). After having received client instructions 111, VM management server 120 may retrieve a set of policies that are associated with the selected tag(s), and return the retrieved set of policies as feedback to VM configuration client 110.

In some embodiments, assign-tag window 230 may display the set of policies from the feedback 113 in a "real-time feedback" GUI element such as message 244. The information in message 244 may show that there are two policies currently associated with the VM tag "vmTag." By displaying real-time information of the policies that may apply to the new VM with the selected tag, the user can quickly grasp the impact of his or her proposed actions, thereby allowing a more efficient and accurate configuration of the new VM.

Deletion of a Tag

In some embodiments, VM configuration client 110 includes additional GUI elements to support a tag deletion process. Specifically, in the tag deletion process, a delete-tag window (not shown in FIG. 2) may be presented to a user to select a specific tag for deletion. Since the specific tag may be associated with multiple policies, the deletion of the specific tag may also affect all the associated policies. Thus, the delete-tag window may display in real-time a warning of possible impacts of the tag deletion process before the user proceeds to complete the deletion process.

In some embodiments, the delete-tag window may display the set of policies that are associated with the tag to be deleted in a real-time GUI element similar to message 244. The information in message 244 may show that for the tag to be deleted, there are associated policies that will also be affected. By providing this real-time feedback, the user can quickly grasp the impact of his or her actions before proceeding further.

Management of Policies

After the creation of VMs and policies and the assignment of tags, VM configuration client 110 includes additional GUI elements to support management of policies. FIG. 3 shows example GUI elements for managing multiple policies, according to one or more embodiments of the present disclosure.

In particular, management window 300 in FIG. 3 illustrates two GUI elements for the two policies that have been created. Management window 300 also includes an "Add" button to add a new policy. Policy 302 has policy name 304 (e.g., "vm host affinity 1"), selected VM management server name 306 (e.g., VM management server 120), selected policy type 308 (e.g., "VM host affinity"), and message 310. In some embodiments, message 310 displays real-time information pertaining to the number of VMs associated with policy 302 that currently have the specified tag category and tag name. For instance, as shown in FIG. 3, message 310 displays that 2 VMs have the specified tag category of "x" and tag name of "all tags."

In addition, suppose the status of each of these 2 VMs is inactive. The status information of the VMs is then aggregated for policy 302, and the aggregated status information is then presented as "inactive" in text, image, or a combination of text and image. In FIG. 3, the aggregated status information is presented as "inactive" in text only.

Similarly, compute 312 also has policy name 314 (e.g., "vmotion 1"), selected management server name 316 (VM management server 122), selected policy type 318 (e.g., "Evacuate vMotion"), and message 320. In some embodiments, each of the policy name, selected VM management server name, and VM policy type may be a selectable GUI item. For example, in response to a user's selection of policy name 314, "vmotion 1," a different GUI element, details view 350 is displayed.

In details view 350, in addition to real-time object count 352, which indicates the number of VMs the policy "vmotion 1" regulates, additional information about the VMs is presented. In some embodiments, the names of the VMs, their respective status, the identities of the hosts supporting the VMs, and the VM cluster that the VMs belong to are presented. By presenting such detailed information about the VMs to a user, the user is able to identify possible issues and manage VM clusters more easily.

Figure 4:
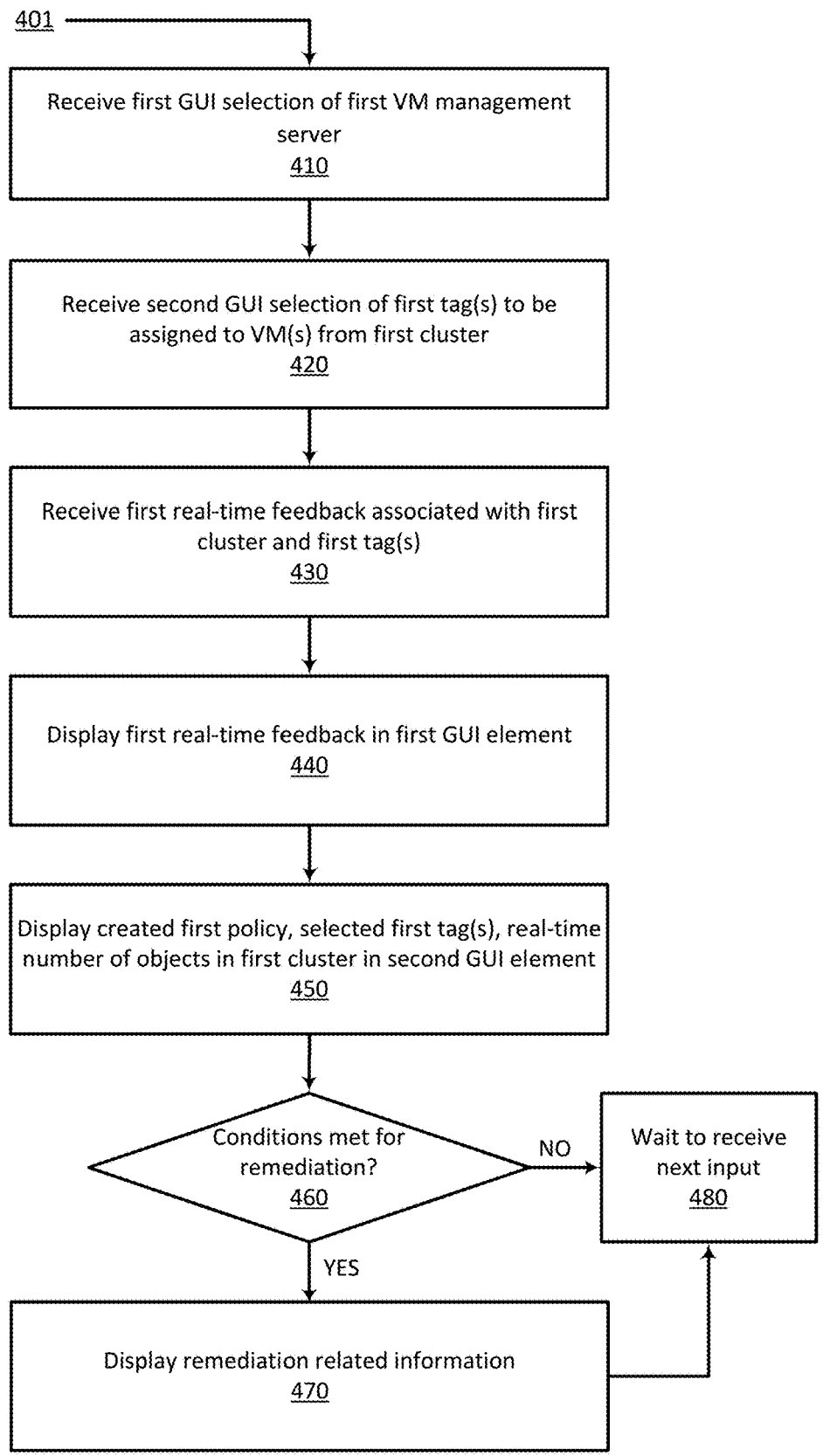
FIG. 4 shows a flow diagram illustrating a process to create and manage policies with GUI elements, according to one or more embodiments of the present disclosure.

FIG. 4 shows a flow diagram illustrating a process to create and manage policies with GUI elements, according to one or more embodiments of the present disclosure. Process 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

Using FIGS. 1, 2, and 3 as an example, at block 410, a VM configuration client (e.g., VM configuration client 110) may receive a first GUI selection (e.g., a selection of an item in server selection drop-down menu 215 in create-policy window 210) of a first VM management server (e.g., VM management server 120). With the selected server, the first VM management server may send the VM configuration client a set of available first tags from a first cluster (e.g., VM cloud/cluster 140) that it has access to.

At block 420, the VM configuration client receives a second GUI selection (e.g., a selection of an item in VM category drop-down menu 222, VM tag drop-down menu 224, host category drop-down menu 223, or host tag drop-down menu 225) of first tag(s) (e.g., VM tags and/or host tags), wherein the selected tags are to be assigned to one or more VMs from the first cluster.

At block 430, the VM configuration client receives first real-time feedback associated with the first cluster and the first tag(s) from the VM management server.

At block 440, the VM configuration client displays the first real-time feedback (e.g., first object count 226 and/or second object count 227) in a first GUI element (e.g., create-policy window). With the displayed real-time feedback associated with creating a first policy, a user is able to make informed decisions regarding the creation and management of this first policy.

After having created the first policy, at block 450, the VM configuration client may display at least the first policy, the selected first tag(s), and the first real-time feedback (e.g., real-time number of objects in VM cloud/cluster 140 that have the selected first tag(s) and are regulated by the first policy) in a second GUI element (e.g., management window 300).

In some embodiments, the VM configuration client may similarly retrieve the one or more previously created policies and also display such policies in the second GUI element.

At block 460, the conditions for remediation are checked, either by the administrator using the VM configuration client or by the selected first VM management server. To illustrate, suppose the first policy is a VM-VM anti-affinity policy, and suppose 16 VMs are displayed in the second GUI element to be affected in block 450. However, suppose these 16 VMs are actually on the same host, against the VM-VM anti-affinity policy. In this situation, conditions for remediation have been met, because 15 of the 16 VMs need to be migrated to another host to comply with the VM-VM anti-affinity policy.

In another example, suppose the administrator reviews the information displayed in the second GUI element in block 450 and recognizes discrepancies (e.g., the displayed number of objects is significantly higher than expected). The conditions for remediation have also been met, because the recognized discrepancies need to be reconciled.

If the conditions for remediation are met, process 401 proceeds to block 470. At block 470, the VM configuration client may display remediation related information, such as the results of the remediation or the potential impact for performing remediation. Using the above example of migrating 15 VMs, suppose the potential impact for migrating all 15 VMs at once is significant and is shown to the administrator, the administrator may decide to consider alternative schemes, such as migrating the 15 VMs before creating the VM-VM anti-affinity policy, removing the tag from half of the VMs and retagging these VMs after the first batch of the migration completes, or other remediation schemes.

On the other hand, if the conditions for remediation have not been met, then process 401 proceeds to block 480. At block 480, the VM configuration client waits to receive the next input, either from an administrator or from the selected first VM management server.

Thus, systems and methods for configuring virtual infrastructure objects (e.g., VMs) via a GUI have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for configuring virtual infrastructure objects via a graphical user interface (GUI), the method comprising:
    receiving, by a configuration client, a first GUI selection in a first GUI element supported by the configuration client, wherein the first GUI selection specifies a first management server that corresponds to a first cluster of virtual infrastructure objects;
    receiving, by the configuration client, a second GUI selection in the first GUI element, wherein the second GUI selection specifies one or more first virtual infrastructure object tags to be assigned to at least one virtual infrastructure object from the first cluster of virtual infrastructure objects after a creation process of a first policy, and the first policy is configured to regulate the at least one virtual infrastructure objects from the first cluster of virtual infrastructure objects with the one or more first virtual infrastructure object tags;
    receiving, by the configuration client, first real-time feedback associated with the first cluster of virtual infrastructure objects and the one or more first virtual infrastructure object tags from the first management server;
    displaying, by the configuration client, a first object count in the first GUI element;
    receiving, by the configuration client, a third GUI selection in the first GUI element, wherein the third GUI selection specifies one or more first host tags to be assigned to at least one host from a first cluster of hosts that supports the first cluster of virtual infrastructure objects during the creation process of the first policy, and the first policy is configured to regulate the at least one host from the first cluster of hosts with the one or more first host tags;
    receiving, by the configuration client, second real-time feedback associated with the first cluster of hosts and the one or more first host tags from the first management server;
    displaying, by the configuration client, a second object count in the first GUI element; and
    displaying, by the configuration client, remediation related information associated with the first policy if conditions for remediation are met based on the first object count or the second object count.

2. The method of claim 1, further comprising:
    after having created the first policy, displaying, by the configuration client, the first policy, the selected one or more first virtual infrastructure object tags, the selected one or more first host tags, or both and a real-time number of virtual infrastructure objects in the first cluster of virtual infrastructure objects regulated by the first policy in a second GUI element supported by the configuration client.

3. The method of claim 2, further comprising:
    in response to a fourth GUI selection of the first policy in the second GUI element, displaying, by the configuration client, the status information associated with each of the virtual infrastructure objects in the first cluster of virtual infrastructure objects regulated by the first policy and a third object count in a third GUI element.

4. The method of claim 1, further comprising:
    retrieving, by the configuration client, a second policy, wherein the second policy is configured to regulate at least one virtual infrastructure object from a second cluster of virtual infrastructure objects with one or more second tags; and
    displaying, by the configuration client, the first policy and the second policy in the second GUI element.

5. A non-transitory computer-readable medium having instructions stored thereon, which in response to execution by one or more processors, cause the one or more processors to perform or control performance of operations to configure virtual infrastructure objects via a graphical user interface (GUI), the operations comprising:
    receiving, by a configuration client, a first GUI selection in a first GUI element supported by the configuration client, wherein the first GUI selection specifies a first management server that corresponds to a first cluster of virtual infrastructure objects;
    receiving, by the configuration client, a second GUI selection in the first GUI element, wherein the second GUI selection specifies one or more first virtual infrastructure object tags to be assigned to at least one virtual infrastructure object from the first cluster of virtual infrastructure objects during a creation process of a first policy, and the first policy is configured to regulate the at least one virtual infrastructure object from the first cluster of virtual infrastructure objects with the one or more first virtual infrastructure object tags;

receiving, by the configuration client, first real-time feedback associated with the first cluster of virtual infrastructure objects and the one or more first virtual infrastructure object tags from the first management server;

displaying, by the configuration client, a first real-time object count in the first GUI element;

receiving, by the configuration client, a third GUI selection in the first GUI element, wherein the third GUI selection specifies one or more first host tags to be assigned to at least one host from a first cluster of hosts that supports the first cluster of virtual infrastructure objects during the creation process of the first policy, and the first policy is configured to regulate the at least one host from the first cluster of hosts with the one or more first host tags;

receiving, by the configuration client, second real-time feedback associated with the first cluster of hosts and the one or more first host tags from the first management server;

displaying, by the configuration client, a second object count in the first GUI element; and displaying, by the configuration client, remediation related information associated with the first policy if conditions for remediation are met based on the first object count or the second object count.

6. The non-transitory computer-readable medium of claim 5, wherein the operations further comprise:

after having created the first policy, displaying, by the configuration client, the first policy, the selected one or more first virtual infrastructure object tags, the selected one or more first host tags, or both and a real-time number of virtual infrastructure objects in the first cluster of virtual infrastructure objects regulated by the first policy in a second GUI element supported by the configuration client.

7. The non-transitory computer-readable medium of claim 6, wherein the operations further comprise:

in response to a fourth GUI selection of the first policy in the second GUI element, displaying, by the configuration client, the status information associated with each of the virtual infrastructure objects in the first cluster of virtual infrastructure objects regulated by the first policy and a third object count in a third GUI element.

8. The non-transitory computer-readable medium of claim 5, wherein the operations further comprise:

retrieving, by the configuration client, a second policy, wherein the second policy is configured to regulate at least one virtual infrastructure object from a second cluster of virtual infrastructure objects with one or more second tags; and displaying, by the configuration client, the first policy and the second policy in the second GUI element.

9. An apparatus to configure virtual infrastructure objects via a graphical user interface (GUI), wherein the apparatus comprises:

one or more processors; and a non-transitory computer-readable medium having instructions stored thereon, which in response to execution by the one or more processors, cause the one or more processors to:

receive a first GUI selection in a first GUI element supported by the apparatus, wherein the first GUI selection specifies a first management server that corresponds to a first cluster of virtual infrastructure objects;

receive a second GUI selection in the first GUI element, wherein the second GUI selection specifies one or more first virtual infrastructure object tags to be assigned to at least one virtual infrastructure object from the first cluster of virtual infrastructure objects during a creation process of a first policy, and the first policy is configured to regulate the at least one virtual infrastructure object from the first cluster of virtual infrastructure objects with the one or more first virtual infrastructure object tags;

receive first real-time feedback associated with the first cluster of virtual infrastructure objects and the one or more first virtual infrastructure object tags from the first management server;

display a first real-time object count in the first GUI element;

receive a third GUI selection in the first GUI element, wherein the third GUI selection specifies one or more first host tags to be assigned to at least one host from a first cluster of hosts that supports the first cluster of virtual infrastructure objects during the creation process of the first policy, and the first policy is configured to regulate the at least one host from the first cluster of hosts with the one or more first host tags;

receive second real-time feedback associated with the first cluster of hosts and the one or more first host tags from the first management server;

display a second real-time object count in the first GUI element; and display remediation related information associated with the first policy if conditions for remediation are met based on the first real-time object count or the second real-time object count.

10. The apparatus of claim 9, wherein the non-transitory computer-readable medium having additional instructions stored thereon, which in response to execution by the one or more processors, cause the one or more processors to:

after having created the first policy, display the first policy, the selected one or more first virtual infrastructure object tags, the selected one or more first host tags, or both and a real-time number of virtual infrastructure objects in the first cluster of virtual infrastructure objects regulated by the first policy in a second GUI element supported by the configuration client.

11. The apparatus of claim 10, wherein the non-transitory computer-readable medium having additional instructions stored thereon, which in response to execution by the one or more processors, cause the one or more processors to:

in response to a fourth GUI selection of the first policy in the second GUI element, display the status information associated with each of the virtual infrastructure objects in the first cluster of virtual infrastructure objects regulated by the first policy and a third object count in a third GUI element.

12. The apparatus of claim 9, wherein the non-transitory computer-readable medium having additional instructions stored thereon, which in response to execution by the one or more processors, cause the one or more processors to:

retrieve a second policy, wherein the second policy is configured to regulate at least one virtual infrastructure object from a second cluster of virtual infrastructure objects with one or more second tags; and display the first policy and the second policy in the second GUI element.

13. The method of claim 1, further comprising, after receiving the first GUI selection, receiving a set of tags from the first cluster that the first management server has access to, wherein the one or more first virtual infrastructure object tags specified by the second GUI selection is included in the set of tags.

\* \* \* \* \*